May 29, 1962
P. DARDE
3,036,381
DEVICE FOR QUICK-RELEASABLY HOLDING
PEAK READING OF A GAGE
Filed Aug. 26, 1959
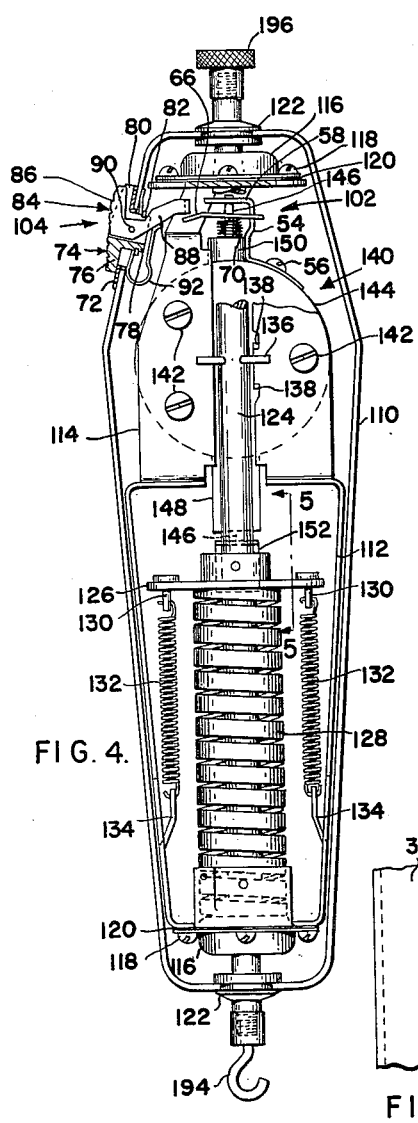
FIG. 4.
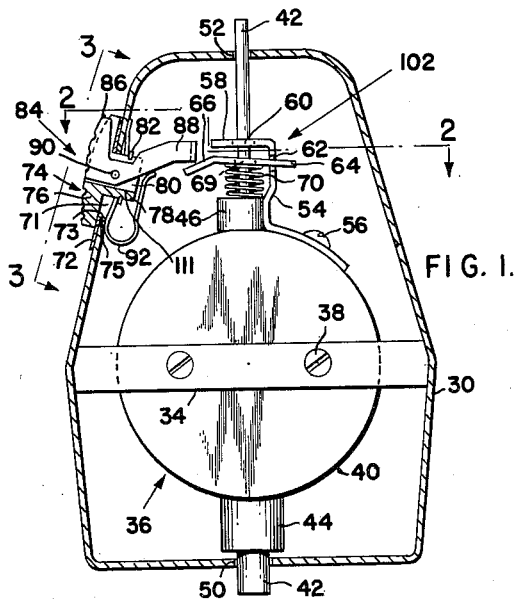
FIG. 1.
FIG. 2.
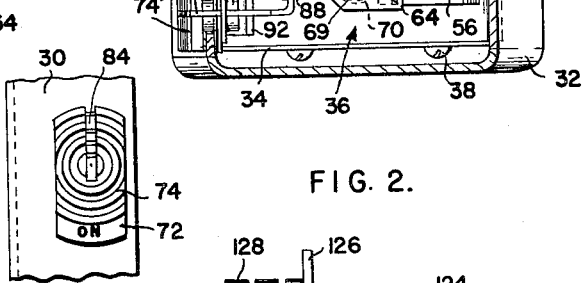
FIG. 3.
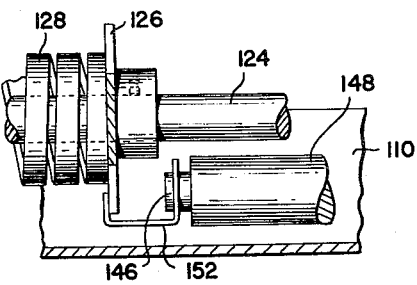
FIG. 5.
INVENTOR.
PETER DARDE
BY
Busser, Smith & Harding
ATTORNEYS United States Patent Office 3,036,381
Patented May 29, 1962

3,036,381
DEVICE FOR QUICK-RELEASABLY HOLDING
PEAK READING OF A GAGE
Peter Darde, Line Lexington, Pa., assignor to Ametek,
Inc., a corporation of Delaware
Filed Aug. 26, 1959, Ser. No. 836,103
2 Claims. (Cl. 33—172)

This invention relates generally to gages, and particularly to an improved device for quick-releasably holding the peak reading of a distance measuring gage.

An important object of the present invention is to provide a gage having a dial indicator with improved means for holding the peak or maximum reading of the device. Another important object of the present invention is to provide such a device in which no frictional load is applied to the distance indicating pointer.

Still another object of the present invention is to provide such a device with which repetitive readings are very quickly obtained and released or wiped off.

A further object of the present invention is to provide such a device which may be conveniently conditioned for holding the reading obtained or not holding the reading obtained, as desired.

Other objects and advantages of the present invention will appear more fully from the following description when read in conjunction with the accompanying drawing, in which:

FIGURE 1 is a view looking at the back of the device, with the rear section of the housing removed;

FIGURE 2 is a section on line 2—2 of FIGURE 1;

FIGURE 3 is a view as indicated by line 3—3 of FIGURE 1;

FIGURE 4 is a view looking at the back of a force gage constructed in accordance with the invention, the rear section of the housing being removed; and FIGURE 5 is an enlarged section on line 5—5 of FIGURE 4.

Referring to the drawing and particularly to FIGURES 1, 2 and 3, the exemplary device constructed in accordance with the invention comprises a frame including a longitudinally split housing having a fore section 30 and a rear section 32. Mounted within the fore section 30, as by a bracket or frame member 34 is a dial indicator 36 fastened to the bracket by screws 38. The dial indicator may be any conventional type having a casing and a shaft biased as by a spring to a reference position and mounted for reciprocation in the casing. As shown, the dial indicator is provided with a casing 40 and an elongated member or shaft 42 axially shiftable in suitable sleeves 44 and 46. Preferably the dial indicator is provided with a movable face 48 for zero setting. Such dial indicators are well-known to the art. For example, reference may be had to United States Letters Patent No. 1,966,424, No. 2,585,368, or No. 2,638,679. Although mechanical type indicators have been referred to, it will be understood that the indicator may be of electrical, optical or other type. As shown, the opposite end portions of the shaft 42 project freely through openings 50 and 52 formed respectively in the bottom and top of the housing.

Mounted upon the casing 40 is a bracket 54 which is secured in place by a screw 56. This bracket extends upwardly from the indicator and is provided with a turned over portion 58 having an aperture 60 formed therein. The upper terminal portion of the shaft 42 extends freely through the aperture 60. Opposite side portions of the bracket 54 are provided with notches 62, which notches receive prongs 64 formed on a latch plate 66 by means of a recess 68. The latch plate is provided with an aperture 69 through which there extends freely the upper terminal portion of the shaft 42. Underlying the latch plate is a coil compression spring 70 through which shaft 42 passes freely.

It will be apparent that the bracket 54 is not necessarily mounted upon the casing 40; it could be mounted upon the housing section 30 and considered with the housing as the frame structure of the device.

Mounted upon the housing section 30 is a push button assembly comprising a plate 72 having a central area apertured, as at 71, and flanged, as at 73, and pressed into an opening 75 formed in the housing section. Carried by the plate 72 is a slide release button 74 provided with a head 76 and a stem 78, the latter being slidably projected through the opening 71 in the plate 72. The button 74 is provided with a slot 80 and a retainer element 82 extending about the stem 78. Nested in and extending through the slot 80 is a momentary release button 84 having a head portion 86 and an arm portion 88, being pivoted between the head and arm on a pin 90, the opposite end portions of which are anchored in the button 74, on opposite sides of the slot 80. The assembly is provided with a leaf spring 92 which has a bowed end portion interposed between the housing section 30 and the retainer element 82 and which acts to secure the push button assembly to the housing and to bias the arm 88 upwardly away from the latch plate 66 and the head 86 downwardly toward the base wall of the slot 80, designated 111.

In the operation of the device, when the shaft 42 is shifted axially relative to the casing 40, the indicator 36 visually indicates the amount of movement. When the shaft 42 is released, the shaft 42 tends to return to its initial or reference position, being biased by means internally of the indicator, not shown. However, the latch plate 66 being biased clockwise, as viewed in FIGURE 1, by the spring 70, thereby to reduce the effective size of the aperture 69, frictionally engages with the shaft 42 on diametrically opposite sides thereof and prevents return of the shaft 42 thus causing the indicator to hold the peak or maximum distance reading. In order to release the shaft 42 so as to permit its return and effect wiping off of the peak or maximum distance reading, it is merely necessary to touch the button head 86 of the momentary release button 84, whereupon the arm 88 of the momentary release button swings clockwise against the influence of the leaf spring 92 thereby to depress the underlying end portion of the latch plate 66. As the latch plate turns counterclockwise its frictional grip upon the shaft 42 is released, whereupon the shaft 42 returns to its initial position and the indicator returns to zero reading. In the event that it is not desired to hold peak or maximum distance readings, it is merely necessary to shift the push button assembly from the position thereof shown in FIGURE 1 downwardly to the other end of the opening 71 formed in the plate 72, whereupon the head 86 of the button 84 engages the wall 111 at the base of the slot 80 and the arm 88 of the button 84 acts to hold the latch plate 66 down permanently so that it cannot frictionally engage the shaft 42 to prevent movement thereof in either direction.

Referring to the drawing and particularly to FIGURES 4 and 5, the force gage illustrated is constructed in accordance with the invention. Many of the parts are identical with parts of the device already described; the same numeral has been applied to identical parts. The force gage comprises a longitudinally split housing having a fore section 110. Within the housing is a rigid frame structure having a lower section 112 and an upper section 114 each secured to the other and to the housing section 110 by means not shown. At the opposite ends of the frame respectively are a pair of plates 116 secured to the frame by screws 118. Clamped between each plate 116 and the frame is a bearing 120 made of thin flat spring steel. The bearing has an opening formed centrally therein and a spiral cutout portion, neither of which is shown. The outer end portion of the bearing is received between the plate 116 and the frame. At the opposite ends of the housing section 110 respectively are a pair of bushings 122. A rod 124 extends freely through the bushings 122 and the plates 116. The rod 124 also extends through the spring bearings 120, the inner ends of these bearings being anchored to the rod by means not shown.

Fitted over the rod 124 is a crossarm 126 secured in any suitable manner against axial shifting movement. Wrapped around the rod 124 is a main spring 128 seated against the crossarm and the bottom of the frame. The crossarm 126 carries a pair of pins 130 each of which is anchored to one end of a preloading spring 132, the other end of the spring being anchored to a struckout portion 134 of the frame. Fixed to the rod 124 is a pin 136 arranged for coaction with abutments 138 struck out from the frame.

Mounted upon the frame section 114 is a dial indicator 140 secured in place by screws 142. The dial indicator may be the same in all essential respects as the dial indicator 36, already described. As shown, the dial indicator is provided with a casing 144 and a shaft 146 axially shiftable in suitable sleeves 148 and 150. The lower terminal portion of the shaft 146 carries a C-shaped element 152, one end of which detachably hooks under the crossarm 26.

As thus far described, the force gage is, in essence, similar to the force gage disclosed in United States Letters Patent No. 2,612,012.

The force gage is provided with a latch assembly 102 identical with the one already described including the pivotally mounted latch plate 66 and the compression spring 70 wrapped loosely around the shaft 146, which extends freely through the latch plate 66 and the bracket 54. The force gage is also provided with a push button assembly 104 identical with the one already described including the plate 72 mounted on the housing section 110, slide release button 74, momentary release button 84 and leaf spring 92.

In the operation of the force gage, the load is applied to the rod 124 as by suspending it from a hook 194 threaded on the lower end of the rod 124 or applying it to an element 196 threaded to the upper end of the rod 124. Axial displacement of the rod 124 under the influence of the load displaces the crossarm 126, which in turn axially displaces the shaft 146 of the indicator. When the load is removed, the rod 124 returns to its initial position under the influence of the spring system of the gage, and the shaft 146 tends to return to its initial or reference position for zero reading of the indicator. However, the latch assembly acts, as described hereinbefore, to prevent return of the shaft 146. The push button assembly 104 is manipulated in the same manner as described hereinbefore for controlling the latch plate 66.

It will be apparent that the present invention provides means for quick-releasably holding the peak reading of a gage. With regard to force gages, these devices commonly are provided with an indicating pointer and means to return the pointer to a reference position. When a force is applied to move the gage, the indicating pointer pushes a second pointer or "lazy hand" to the peak or maximum load position, and when the force is removed, the indicating pointer return to its initial position while the lazy hand remains in the peak or maximum load position. Friction is required to hold the lazy hand in the maximum load position, but even a few grams of frictional loading is prohibitive because it produces a serious error in indicated load values, the reason being that the frictional load, instead of being applied to the spring system of the force gage, is applied to the load indicating pointer. In addition, when the force gage is portable, the friction required to hold the lazy hand in maximum load position necessarily is comparatively high because of the ever present possibility that the instrument might be jolted and the reading lost. In addition, therefore, it will be apparent that the present invention eliminates the necessity for a "lazy hand," and the frictional load is applied directly to the spring system of the force gage, in consequence of which the device is greatly improved in accuracy.

It will be understood, of course, that the present invention as hereinbefore described and as shown in the accompanying drawing is susceptible of various changes and modifications which may be made without departing from the principles of the invention. Accordingly, the invention is not to be restricted except as required by the appended claims.

What is claimed is:

1. In combination, an indicator including an axially shiftable elongated member, means for measuring and indicating axial shifting movement of said member in one direction, means biasing said member in the opposite direction, a casing mounting said indicator, an apertured latch mounted in said casing, said member passing freely through said aperture when said latch is in a first position, a spring biasing said latch toward a second position wherein said member is frictionally held by the edge of said aperture, latch releasing means mounted on said casing for movement between first and second positions, said reelasing means including an element for moving said latch against the force of said spring and holding said latch in its first position when said latch releasing means is in its first position, said latch releasing means further including means connected to said element for momentarily causing said element to move said latch against the force of said spring when said releasing means is in its second position.

2. In combination, an indicator including an axially shiftable elongated member, a calibrated dial and a needle for measuring and indicating axial shifting movement of said member in one direction, a first spring biasing said member in the opposite direction, a casing mounting said indicator, an apertured latch mounted on said casing, said member passing freely through said aperture when said latch is in a first position, a second spring biasing said latch toward a second position wherein said member is frictionally held by the edge of said aperture, a latch releasing mechanism slidably mounted on said casing for movement between first and second positions, said mechanism including an element for moving said latch against the force of said second spring and holding said latch in its first position when said latch releasing mechanism is moved to its first position, said latch releasing mechanism further including a push button connected to said element for momentarily causing said element to move said latch to its first position when said releasing mechanism is moved to its second position.

References Cited in the file of this patent
UNITED STATES PATENTS

| | | |
|---|---|---|
| 1,836,601 | Key | Dec. 15, 1931 |
| 2,101,718 | Moore | Dec. 7, 1937 |
| 2,338,078 | Wood | Dec. 28, 1943 |
| 2,420,307 | Fristde | May 13, 1947 |
| 2,806,385 | James | Sept. 17, 1957 |